US008689732B1

(12) United States Patent
Plummer et al.

(10) Patent No.: US 8,689,732 B1
(45) Date of Patent: Apr. 8, 2014

(54) AUTOMATED SYSTEM FOR MAKING A COMPONENT WITH A WOOD GRAINED APPEARANCE

(71) Applicant: Glasscraft Door Company, Houston, TX (US)

(72) Inventors: John B. Plummer, Houston, TX (US); Matthew James O'Shea, Houston, TX (US); Joseph Gene Denley, Cypress, TX (US)

(73) Assignee: Glasscraft Door Company, Houston, TX (US)

( * ) Notice: Subject to any disclaimer, the term of this patent is extended or adjusted under 35 U.S.C. 154(b) by 0 days.

(21) Appl. No.: 13/967,257

(22) Filed: Aug. 14, 2013

Related U.S. Application Data

(63) Continuation-in-part of application No. 13/097,632, filed on Apr. 29, 2011, now abandoned.

(51) Int. Cl.
*B05C 11/10* (2006.01)
*G06F 19/00* (2011.01)
*G06Q 30/00* (2012.01)

(52) U.S. Cl.
USPC ........... 118/667; 118/683; 118/695; 118/696; 118/300; 700/123; 700/97; 705/26.5; 49/501; 52/204.5

(58) Field of Classification Search
CPC ........... G05B 2219/31389; G05B 2219/32024; G06Q 30/0621; E06B 3/30; E06B 3/20; E06B 3/205

USPC ........ 118/300, 695, 696, 697, 698, 683, 666, 118/667, 712; 700/123, 97, 100; 705/26.5, 705/26.1, 26.4, 26.41–26.44; 52/204.5, 52/515, 313, 745.19; 49/381, 501
See application file for complete search history.

(56) References Cited

U.S. PATENT DOCUMENTS

| | | | | | |
|---|---|---|---|---|---|
| 5,357,439 | A | * | 10/1994 | Matsuzaki et al. | 700/96 |
| 5,463,555 | A | * | 10/1995 | Ward et al. | 700/96 |
| 6,955,946 | B2 | * | 10/2005 | Bouras et al. | 438/108 |
| 7,333,876 | B2 | * | 2/2008 | Knight et al. | 700/123 |
| 8,538,569 | B1 | * | 9/2013 | Plummer | 700/97 |
| 2011/0138714 | A1 | * | 6/2011 | Van Seters | 52/204.5 |

* cited by examiner

*Primary Examiner* — Yewebdar Tadesse
(74) *Attorney, Agent, or Firm* — Buskop Law Group, PC; Wendy Buskop

(57) ABSTRACT

A system for creating a wood like appearance on a synthetic component including a sales client device, a network, computer instructions for creating a work order, a tray with scannable tray identifier to hold a synthetic component, a production client device connected to the network with computer instructions for applying a base coat, a glaze, and a top coat to the synthetic component as it automatically moves on a conveyer system a portion of which is connected to the production client device. A scannable tray identifier with a plurality of sensors link the tray identifier to the work order for authenticating and validating the location of the tray on the conveyor system, or initiating an alerting device. The system has a plurality of temperature control environments to simultaneously control heating of the synthetic component while spraying, drying and UV curing with spray treatment device.

20 Claims, 4 Drawing Sheets

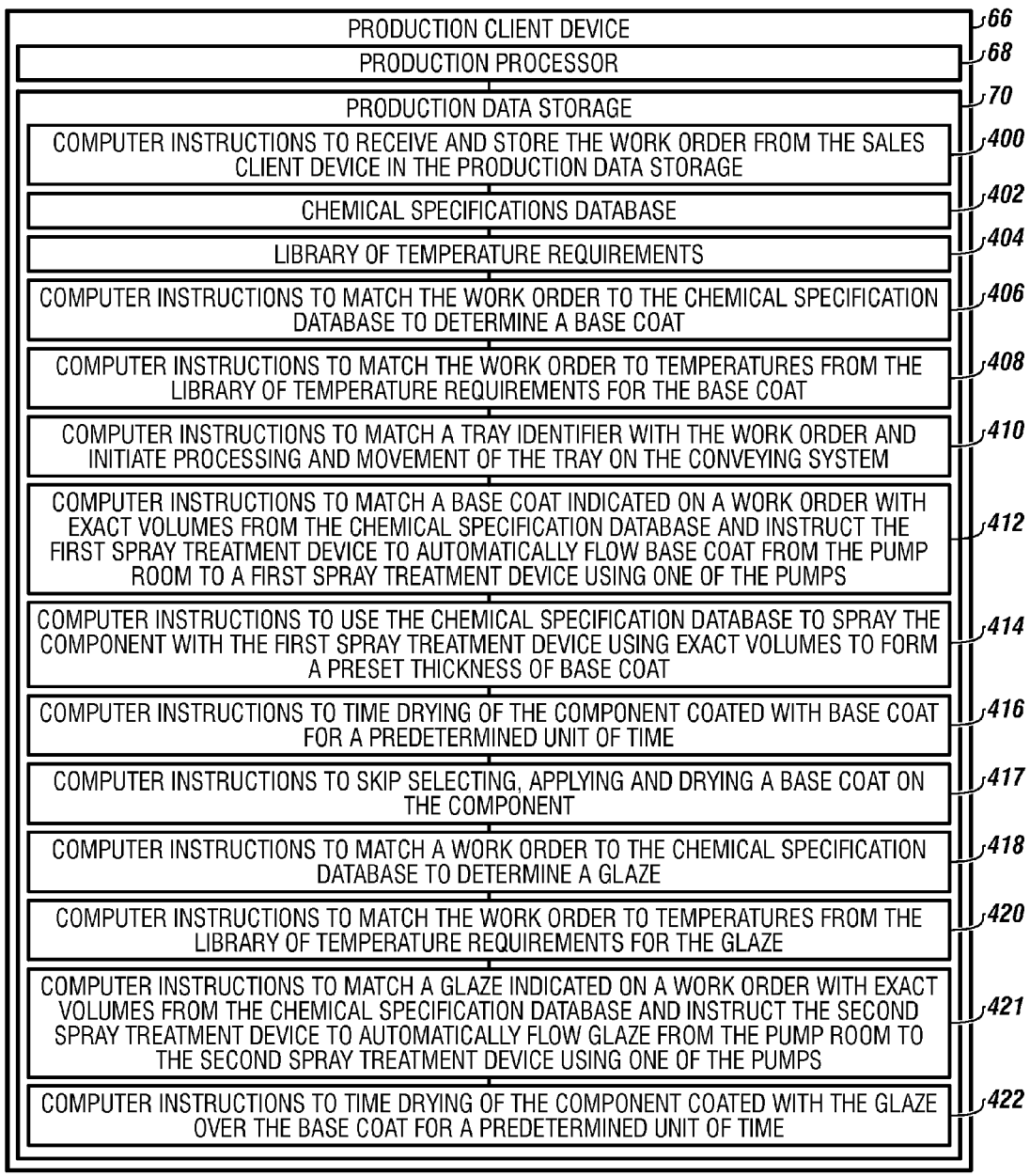

AUTOMATED SYSTEM FOR MAKING A COMPONENT WITH A WOOD GRAINED APPEARANCE

CROSS REFERENCE TO RELATED APPLICATIONS

The current application is a Continuation in Part of co-pending U.S. patent application Ser. No. 13/097,632 filed on Apr. 29, 2011, entitled "METHOD FOR MAKING A COMPONENT WITH A WOOD GRAINED APPEARANCE". This reference is hereby incorporated in its entirety.

FIELD

The present embodiments generally relate to a computer controlled automated system for making a non-wood component with a wood grained appearance.

BACKGROUND

A need exists for an automated system that creates polymer and non-natural components that have a wood-like look.

A need exists for a computer controlled automated system for producing components that are made from synthetic material to have a wood-like appearance, thereby preventing the destruction of old growth forest.

A need exists for a computer controlled automated system that provide doors that are better insulated and formed from a small carbon footprint that looks like a wood door without being a wood door.

The present embodiments meet these needs.

BRIEF DESCRIPTION OF THE DRAWINGS

The detailed description will be better understood in conjunction with the accompanying drawings as follows:

FIG. 4 is a diagram of the production client device.

Figure 1:
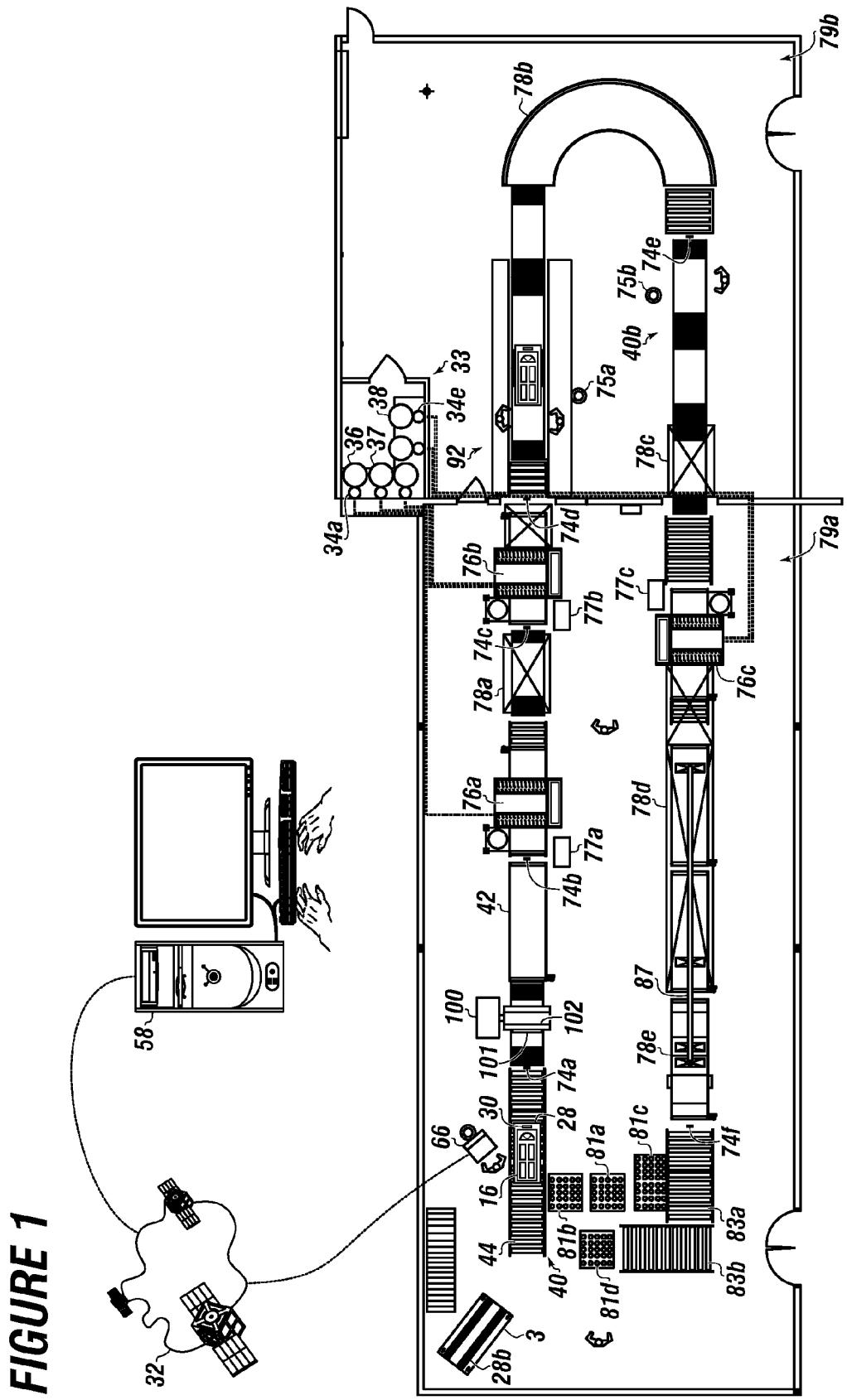
FIG. 1 is an overview of the system.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments generally relate to a computer controlled automated system for making a non-wood component with a wood grained appearance.

A benefit of the invention is that fewer workers will be subjected to volatile organic fumes while manufacturing doors and windows. Fewer workers will end up in the hospital on respirators because there are so few workers needed in this production process in the spraying area.

A benefit of the invention is that this door manufacturing process will be automated enabling more doors that are well insulated and with improved security can be manufactured for a lower price enabling more people to buy new doors for their houses for improved security.

A benefit of the invention is that lower energy costs that other processes are incurred with this process, saving the use of fossil fuels.

A benefit of the invention is that the final product, of the door with the wood like appearance can sustain hurricane force winds and protect inhabitants from broken bones during hurricanes when doors break down.

A benefit of the strong doors made by the system is that they can prevent burglaries and home invasions.

The invention provides an automated computer operated system to make doors quickly with tremendous versatility in colors and top coats for individual components which requires fewer air handlers, fewer lights, and less air conditioning than current techniques for making doors by hand or by using semi-automated techniques.

The system inventively uses sensors that read tray identifiers secured to trays that hold the component as it travels down the production line. The sensors connect with a production client device that matches the sensed tray identifier with a work order for faster automated processing.

The tray identifiers can be bar codes, radio frequency identification "RFID" tags, QR codes or similar scannable identifiers.

The tray identifiers are in a data base of specifications for the type of base coat, the type and thickness of glaze and the type and thickness of a top coat. The database enables fast processing, and an automated processing such that over 100 doors can be made by 6 people in one day, as compared with prior systems that required 50 people to manufacture 100 doors in that same day.

A benefit of the system is that it will enable more doors to be made in the United States and create more jobs, since a lot of door manufacturing is currently not in the United States, and in countries like Taiwan, Korea and Indonesia. This invention will enable jobs to return to the United States improving the balance of trade.

The term "work order" as used herein can refer to a document, which can be electronic, that contains information on color, component thickness, component overall size, requirements for door lights, requirements for certain extra molding that might be desired on the final component, if the component is a door. If the component is a wood panel, the work order includes thickness of the panel, type of core insert, an insulation rating, a fire resistant coating, and types of wood graining, such as close oak grain, or wide pine grain. Work orders, in an embodiment, include requests for additional laser treatment to create knots or logos in the door. If the component is a window, or a door, the work order includes size and type glass to be inserted into the final product, an indication if the color of the sill is different from the frame, and if the final product includes additional security grills overlaid the window.

In embodiments, the term "work order" as used herein, in addition to the definitions described above, can include information on size of openings for the component.

In an embodiment, client devices usable in the system can be laptops, computers, or a computerized controller, such as a central processing unit (CPU) for monitoring and running an automated production line.

The invention uses a production client device to operate the system based on information obtained from a sales client device connected via a network.

In embodiments, the invention can be logged into via a network from anywhere in the world.

In embodiment, the invention enables customers in Canada to place orders to a company in Houston, Tex., and create a custom door and ship the custom door, all without human involvement, other than the customer.

In embodiments, the sales client device can contain "customer information" which can include financial information.

The term "customer information" as the term is used herein can refer to a company name, a contact at the company, a company address, and email or cell number at a minimum. In embodiments, customer information includes customer credit information, including credit card information for completing a purchase, banking information including wire transfer information for completing a purchase, and shipping instructions.

The term "chemical specifications database" as the term is used herein can refer to mathematical mixtures of different glazes and base coat colors to achieve a customer specification. For example, the database would contain the appropriate ratios of dark brown base coat, plus a first water based tan urethane glaze and a second water based red urethane glaze to create a mahogany wood appearance component, such as in a 3:1:1 ratio.

The same database can contain thickness for spraying, such as 1 mil layer of brown base coat and 2 mil layer of each of the tan and red water based urethane glazes.

The chemical specification database in embodiments can contain the specific and exact volumes of glaze per color to achieve a specific customer specification.

The term "a library of temperature requirements" can refer to the preset temperature limits needed to maintain component surface temperatures and coating temperatures at the correct temperatures to maximize adhesion of the coatings on the component, which may be the skin of the component, during processing. Multiple actions simultaneously are being performed using precise temperatures on the process line, heating the surface of the component, cooling air around a component, and UV curing the component. For example, the base coat can be dried at 70 degrees Fahrenheit, the glaze coat can be dried at 90 degrees Fahrenheit, and the top coat can not only be dried at 102 degrees Fahrenheit but also UV cured simultaneously with this system using the library of temperature requirements.

In one or more embodiments, the library of temperature requirements can include temperature ranges and exact temperatures for maintaining a skin during treatment for both before and after each coating is applied, including temperature limitations for when a top coat, such as one made from polyurethane is applied.

For example, a fiberglass skin for a steel frame door with a biofoam core can have a skin temperature for receiving the first base coat of the skin of from 72 degrees Fahrenheit to 76 degrees Fahrenheit. The temperature for the skin while a glaze is applied can be different, such as 68 degrees Fahrenheit to 72 degrees Fahrenheit, and the temperature range for drying the glaze can be 65 degrees Fahrenheit to 69 degrees Fahrenheit. Further, the temperature of the skin for applying a top coat of clear gloss polyurethane might require a temperature of the skin to be maintained at from 75 degrees Fahrenheit to 77 degrees Fahrenheit and then during drying and UV curing simultaneously, having a different temperature from 90 degrees Fahrenheit to 200 degrees Fahrenheit.

The air conditioning both in the individual station and in the temperature controlled room also controls humidity enabling the coating to dry. It is important to note that in embodiments, only dry heat is applied to the doors by using the air conditioning to remove water from the air, enabling a faster dry and a faster cure than if no air conditioning was used with the heating. Hot wet heat does not dry as fast as heat that is dried according to this process. From 10 percent to 30 percent of the water is removed from the air at each drying position, which is each temperature control environment of the system.

The terms "front skin" and "back skin" refer to a sheet of polymer or fiberglass/steel with a thickness from 1 mm to 4.5 mm which is fixed to a frame to form a component, such as a door to be treated by the system.

In embodiments, the skins are also secured to an insulating core which can be a liquid foam that expands into a stiff, insulating foam.

The production client device can be a cloud based processing system connected to the network with multiple data storage and multiple processors connected together to perform the computer instructions of the production client device.

Turning now to the Figures, to FIG. 1 depicts an overview of the system. The system can include a production client device 66 and a sales client device 58 in bidirectional communication with a network 32. The network can be a cellular network, a local area network, a wide area network, a satellite network, the Internet, or combinations thereof. The sales client device can include a sales processor and a sales data storage which can include a work order with a work order identifier. Information from the work order and work order identifier can be communicated to the production client device via the network.

The system can include a tray 28a for supporting a component 16 to be processed. A scannable tray identifier 30 can be attached to the tray for connecting with the production client device. Additional trays 28b can be stored for use on portable holding carts 39.

The term "tray" can refer to a tray, a frame, or a pallet, which in embodiments can be a pallet containing a processor with data storage and computer instructions for holding the component during the treatment process. The tray can support a component to be processed using the work order and the work order identifier. The tray can be made of a rigid material, such as plastic that can support the weight of the component.

The scannable tray identifier is used to communicate via a sensor, such as a bar code scanner, with the production client device enabling the production client device to instantly identify the location of the tray anywhere during the processing of the component. The scannable tray identifier attached to the tray can be matched with the work order identifier via the production client device.

A conveying system 40 can be used for supporting and moving the tray 28a. The conveying system can moveably transport the tray automatically using the production client device.

The term "conveying system" as used herein can refer to a system that can include a motorized belt, non-motorized rollers and 360 degree rollers. The conveying system can allow the tray with the component to move automatically between sections of the production line, such as at a speed of 3 feet to 20 feet per minute. In embodiments, the conveying system can permit intermittent periods of non-movement for certain treatments of the component, such as drying.

The conveying system 40 can include a motorized belt 42 connected to the production client device, non-motorized rollers 83, and 360 degree rollers 81a, 81b, 81c, and 81d.

A pump room 33 can be usable with the system. The pump room can have a plurality of pumps 34a-34e connected to spray treatment devices.

A tank of base coat 36 can be connected to pump 34a which can be connected to the first spray treatment device 76a. The system can include one or more tanks of base coat connected to one or more pumps. An example of a pump usable in this system can be a high pressure, 450 to 1,000 psi made by Kremlin of Plymouth, Mich. An example of the spray treatment device is a low or high pressure spray treatment device that uses compressed air, such as a FLATLINE™ made by Mannix of Mecosta, Mich.

A tank of glaze 37 can be connected to pump 34b which can be connected to the second spray treatment device 76b. The system can include one or more tanks of glaze connected to one or more pumps.

A tank of top coat 38 can be connected to pump 34e which can be connected to the third spray treatment device 76c. The system can include one or more tanks of top coat connected to one or more pumps. An example of a pump usable in this invention can be a low pressure, 15 to 280 psi made by Graco of Minneapolis, Minn. An example of the spray treatment device is a low or high pressure spray treatment device that uses compressed air, such as a FLATLINE™ made by Mannix of Mecosta, Mich.

Additional spray treatment devices can be usable in embodiments of the system.

In embodiments, up to eight tanks of glaze, each containing a different glaze, can connect to the pump or pumps that transmit the glazes in sequence to the second spray treatment device.

The system can use a first sensor 74a connected to the production client device to scan the tray identifier and transmit the tray identifier to the production processor providing a location at the beginning of the processing.

The system can use a second sensor 74b connected to the production client device to scan the tray identifier before a base coat is applied and transmit the tray identifier to the production processor to determine if the base coat is to be applied or stopped from being applied because the component already has a base coat applied to it.

The system can use a third sensor 74c connected to the production client device to scan the tray before the glaze is applied and transmit the tray identifier to the production processor and then initiate computer instructions to the second spray treatment device to apply an identified glaze onto the component.

In embodiments, a fourth sensor 74d can be connected to the production client device to scan the tray and create a first message or connect to a first alerting device 75a.

In embodiments, the message can indicate to the line that wipers need to actuate to wipe a portion of the glaze from the synthetic component. In embodiments, the message can indicate that a second glaze must be applied to the first glaze.

In embodiments, a fifth sensor 74e can be connected to the production client device to scan the tray and create a second message or to connect to a second alerting device 75b. The first and second messages, in embodiments, can provide a second set of information such as to wipe off glaze, to add glaze, or to let the synthetic component pass by the alerting device or that portion of the conveying system.

In embodiments a sixth sensor 74f can be connected to the production processor to scan the tray identifier and verify to the production processor that the tray has completed a processing circuit, in case the synthetic component must be turned over to process the second side of the synthetic component repeating a second loop of the processing line.

The message can be in the form of a color alert such as red, green or yellow. The message can be a text message to a cell phone. The message can be an email to another processor. The message can indicate one of several steps are needed, such as (i) wiping a portion of the glaze from the skin, (ii) allowing the deposited glaze to dry, (iii) identifying the color of the next glaze to be applied, or (iv) do nothing to this synthetic component at this processing location. The message can be transmitted to another client device, such as a cell phone connected to the network, or to an alerting device connected to the network. The message can be a color coded light, a flashing light, an audible signal providing a series of beeps, or TV screens with indicators, such as red X's or green arrows.

It should be noted that if the message indicates glaze is to be removed, the glaze can be removed with an automated rotary wiper, such as model SORBINI™ made by Cefla connected to the production client device.

The first alerting device and second alerting device can be a flashing light, a cell phone, a TV screen, combinations thereof, or the like.

The thickness of the applied base coat can be from 1 wet mil to 3 wet mils.

The term "temperature control environment" as used herein can refer to air conditioning, fans, flash oven, a climate controlled room, infrared lamps, and an ultraviolet lamp. Other heating and cooling mechanisms can be used within the scope of embodiments of the system. The temperature control equipment provides two functions: drying, which occurs first, and curing. This system is unique because it automatically applies, dries and cures coats of base coat, glaze and top coat applied to the component.

A first temperature control environment 78a can be used to create temperatures specified by the temperature requirements library that match the work order.

The system provides accelerated drying and curing faster than ambient. The use of the UV lamp at the end of the production process provides curing in 2 minutes to 6 minutes of the finished component instead of conventional two week curing periods.

Each temperature control environment can have temperature monitoring sensors connected to the production processor to monitor both cool temperatures and hot temperatures enabling the automated maintenance of proper temperatures during processing.

The first temperature control environment can have an infrared heater that supplies a heat of at least 120 degrees Fahrenheit of heat onto the surface of the component. The temperature control environment can also includes mechanical fans, which are multivariable, and air conditioning that blows cool air into the environment which can maintain the temperature in the environment from 70 degrees Fahrenheit to 100 degrees Fahrenheit. The first temperature control environment 78a can have a temperature sensor connected to the production processor for controlling temperature on the component after the base coat is applied to the component. Particularly usable are lamps that flash cure dry and wet coated synthetic components, including ultraviolet, infrared lamps and recycled heat.

A second temperature control environment 78b, third temperature control environment 78c, and fourth temperature control environment 78d can create temperatures specified by the temperature requirements library that match the work order for drying the first glaze, second glaze, and top coat respectively after they are applied to the component.

The fourth temperature control environment can be a long drying tunnel with a recycle loop 87 for recycling heated air between temperature control environments in order to reduce operating costs.

In embodiments, the system can include a fifth temperature control environment 78e, which can be an ultraviolet light curing oven.

Temperature controlled room 79b can house portions of the system. The temperature controlled room 79b can be used to reduce humidity by at least 30 percent in the air surrounding the drying component. The pump room can also be a temperature controlled room to ensure flowability of the glazes, base coat and top coat.

In one or more embodiments, room 79a does not require temperature control.

The scannable tray identifier 30, motorized belts 42, conveying system 40, sensors 74a-74f, alerting devices 75a and 75b, and temperature monitoring sensors can be in wired or wireless connection with one another, the network, the production client device, or combinations thereof.

The system can include a stain modification station 92 that uses motorized glaze wiping method or in embodiments, people to wipe the synthetic component. The stain modification station 92 can provide an activity selected from the group: (i) removing portions of glaze from the synthetic component when the message is created, (ii) adding portions of glaze to the synthetic component when the message is created, (iii) using a specified tool to create a surface quality on the synthetic component, and (iv) combinations thereof.

The system can include a deionization chamber 100 that surrounds the conveying system to remove static and dust and particulate from the component on the conveying system.

An automated brush 101 can be positioned prior to the deionization chamber to remove particulate from the synthetic component on the conveying system.

The system can also include a dust collection system 102 for vacuum removal of particulate and dust from the component positioned between the automated brush 101 and the deionization chamber 100.

In an embodiment, the glaze can be dried on the skin at ambient temperatures without heat lamps and fans operating.

The glaze can be a water based urethane glaze that is dried in a unit a time from 2 minutes to 6 minutes. The thickness of the glaze can be from 1 wet mil to 3 wet mils.

In embodiments, the second glaze can be the same as the first glaze or in a chromatically contrasting color to the first glaze. In embodiments, the second glaze can have a thickness when wet from 1 mil to 3 mils.

It should be noted that one or a plurality of pump rooms can be used connected in series or in parallel.

Embodiments of the system can include automatically connecting the sprayers to an automated pump room which contains tanks of glaze, top coat and base coat. The pumps can be automated. The top coats can be clear, colored, or combinations thereof.

The glazes which can be water based polymer acrylic glazes or water based urethane based glazes that can each be applied using a water based spray system, with nozzles, such as CNC systems or with a reciprocating horizontal water based urethane spraying system, or combinations thereof.

The water based urethane glaze, in embodiments, can contain an antistatic agent.

The water based urethane glaze can have a 7.5 pH to 8 pH. For example, a water based urethane glaze can be provided by Gemini Coatings Company. The water based urethane glaze, the top coat, or combinations thereof can have a resin and acrylic component. The water based urethane glaze, the top coat, or combinations thereof can have a pigment load of about 30 weight percent to about 70 weight percent.

In embodiments, individual air conditioning units 77a, 77b, and 77c can be used. The individual air conditioning units can be portable and can be used to cool the electronics of the spray treatment devices, 76a, 76b, and 76c.

Figure 2:
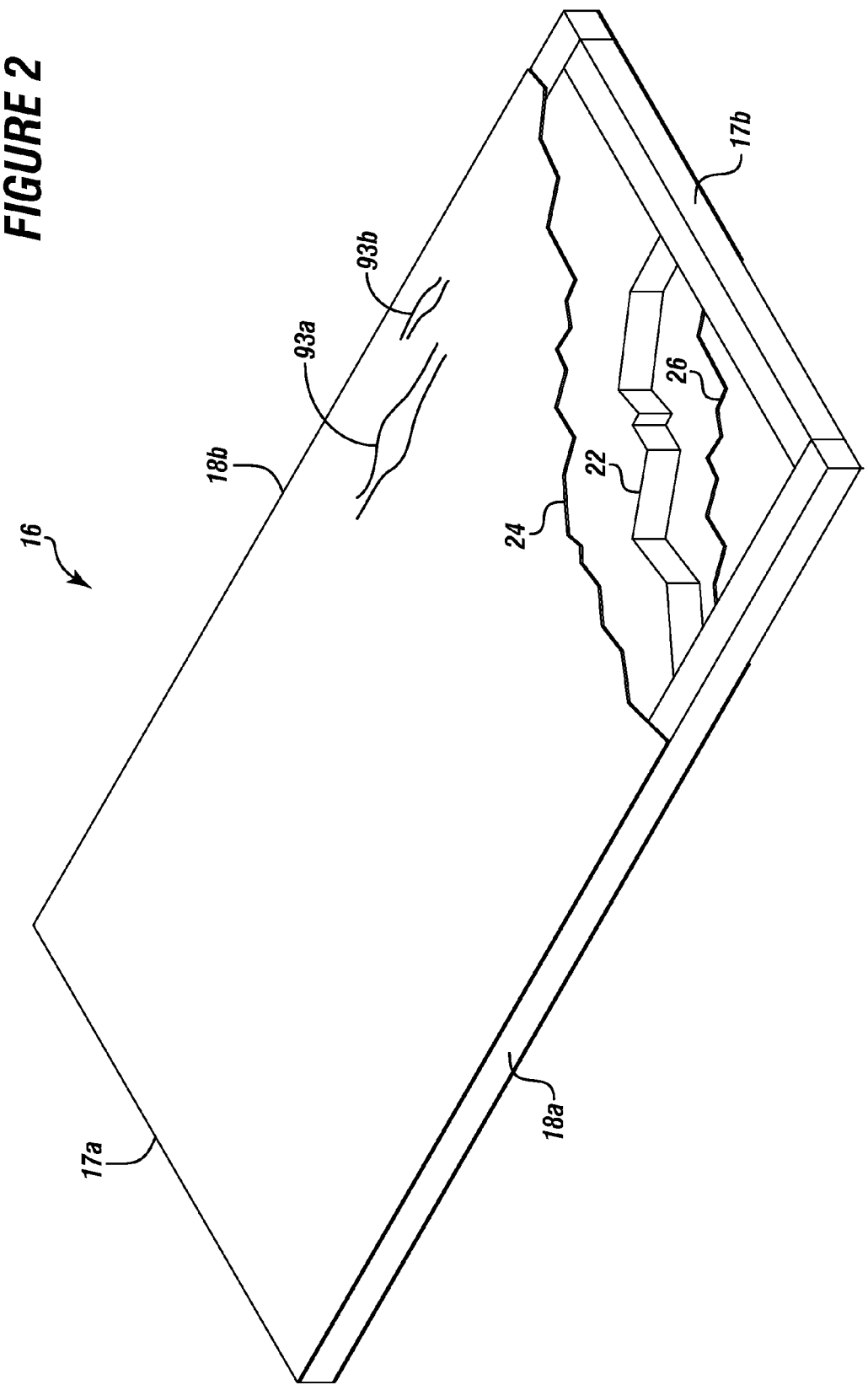
FIG. 2 is a cutaway view of a door made with the system.

FIG. 2 is a cutaway view of a component, which can be a door, made with the system.

The component 16 can have a first horizontal edge 17a, a second horizontal edge 17b, a first vertical edge 18a, and a second vertical edge 18b. The vertical edges can be parallel to one another. The horizontal edges can be parallel to one another. The horizontal edges connect to the vertical edges.

The component can include a core 22, which can be a closed cell foam. The core 22 can have a high R value that has an insulation value of 5 or 6, allowing the closed cell foam to provide thermal and sound insulation.

A front skin 24 can be disposed on a front side of the edges and the closed cell foam.

The front skin 24 can be a fiber reinforced polymer substrate substantially from 2 mm to 3.5 mm in thickness.

A back skin 26 can be disposed on the edges and the closed cell foam opposite the front skin. The back skin can be fiber reinforced polymer substrate. The back skin can have a thickness of from 2 mm to 3.5 mm.

One or more texture marks 93a and 93b can be formed into the front skin, back skin, or combinations thereof.

Figure 3:
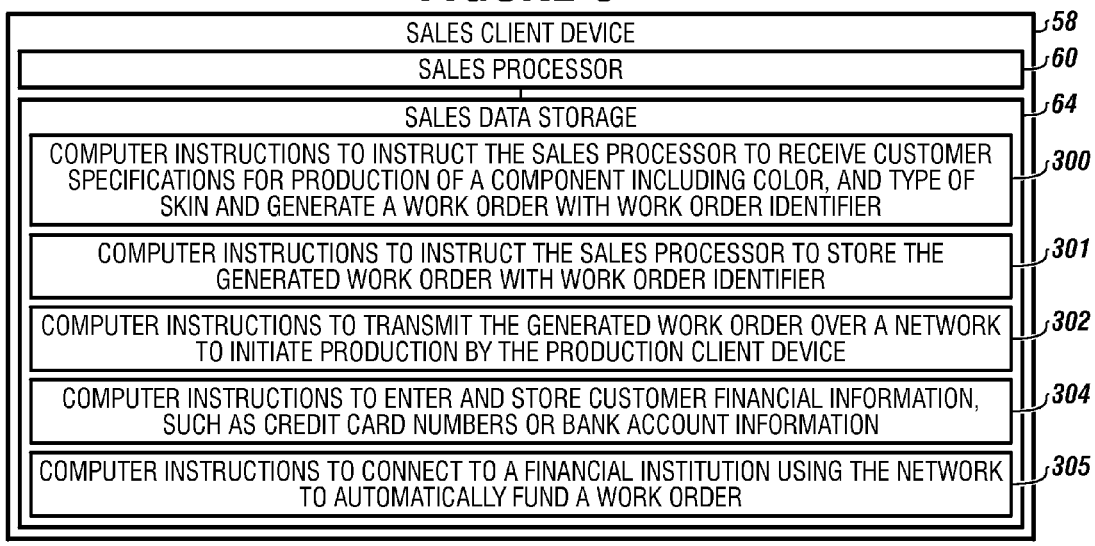
FIG. 3 is a diagram of the sales client device.

FIG. 3 is a diagram of the sales client device. The sales client device 58 can include a sales processor 60 and sales data storage 64 containing computer instructions.

The sales data storage can include computer instructions 300 to instruct the sales processor to receive customer specifications for production of a component including color, and type of skin and generate a work order with work order identifier; computer instructions 301 to instruct the sales processor to store the generated work order with work order identifier; computer instructions 302 to transmit the generated work order over a network to initiate production by the production client device.

The sales data storage can also include computer instructions 304 to enter and store customer financial information, such as credit card numbers or bank account information; and computer instructions 305 to connect to a financial institution using the network to automatically fund a work order.

FIG. 4 is a diagram of the production client device. The production client device 66 can include a production processor 68 and production data storage 70 containing computer instructions.

The production data storage can include computer instructions 400 to receive and store the work order from the sales client device in the production data storage; a chemical specifications database 402; a library of temperature requirements 404 for temperatures surrounding a component during processing; computer instructions 406 to match the work order to the chemical specification database to determine a base coat; computer instructions 408 to match the work order to temperatures from the library of temperature requirements for the base coat; computer instructions 410 to match a tray identifier with the work order and initiate processing and movement of the tray on the conveying system; computer instructions 412 to match a base coat indicated on a work order with exact volumes from the chemical specification database and instruct the first spray treatment device to automatically flow base coat from the pump room to a first spray treatment device using one of the pumps; computer instructions 414 to use the chemical specification database to spray the component with the first spray treatment device using exact volumes to form a preset thickness of base coat; computer instructions 416 to time drying of the component coated with base coat for a predetermined unit of time; computer instructions 417 to skip selecting, applying and drying a base coat on the component; computer instructions 418 to match a work order to the chemical specification database to determine a glaze.

The production data storage can also include computer instructions 420 to match the work order to temperatures from the library of temperature requirements for the glaze; computer instructions 421 to match a glaze indicated on a work order with exact volumes from the chemical specification database and instruct the second spray treatment device to automatically flow glaze from the pump room to the second spray treatment device using one of the pumps.

The production data storage can include computer instructions 422 to time drying of the component coated with the glaze over the base coat for a predetermined unit of time.

In embodiments, the spraying assembly can be isolated in a positive pressure chamber and can have one or more ventilation hoods for removing fumes therefrom. The water soluble spraying assembly can be configured to be operated remotely from the positive pressure chamber.

In embodiments, the wiping rotating members can be a Cefla Sorbini machine, used to remove a portion of one or more of the glazes, top coats, or combinations thereof when wet, to ensure even distribution or proper distribution on the component. For example, the wiping rotating members can be used to remove excess portion of glaze that does not settle in valleys of the component. The valleys can be grain lines, texture lines, custom marks, or other low points of cavities or ridges on the textured surface.

In embodiments, the first skin of the component can fiberglass, the second skin of the component can be a different polymer substrate, a blend of polypropylene and polyethylene, and the core can be a biocide treaded R value high insulating fire retardant expandable foam with an ability to reduce impacts of 20 mph without deforming. The core can be contained within a steel frame. The skins can be adhered to the frame and core with a spray adhesive.

In embodiments, the component can be a door with polypropylene/polyethylene skins, polyvinylchloride skins with the skins embossed with wood grain. In embodiments, the door can be a fiberglass door embossed with wood grain, a steel door embossed with wood grain, a medium density fiberboard door embossed with wood grain, a hardboard door embossed with wood grain, and combinations thereof.

While these embodiments have been described with emphasis on the embodiments, it should be understood that within the scope of the appended claims, the embodiments might be practiced other than as specifically described herein.

What is claimed is:

1. An automated system for creating a component with a wood appearance, the component having a core, a first skin disposed over the core, and a second skin disposed over the core on a side opposite the first skin, the automated system comprising:
   a. a sales client device connected to a network comprising:
      i. a sales processor; and
      ii. a sales data storage connected to the sales processor, the sales data storage comprising:
         1. computer instructions to instruct the sales processor to receive customer specifications for production of a component including color, and type of skin and generate the work order with a work order identifier;
         2. computer instructions to instruct the sales processor to store the generated work order with work order identifier; and
         3. computer instructions to transmit the generated work order over the network;
   b. a production client device connected to the network and the sales client device, the production client device comprising:
      i. a production processor; and
      ii. a production data storage connected to the production processor, the production data storage comprising:
         1. computer instructions to receive and store the work order from the sales client device in the production data storage;
         2. a chemical specifications database;
         3. a library of temperature requirements for temperatures surrounding a component during processing;
         4. computer instructions to match the work order to the chemical specification database to determine a base coat;
         5. computer instructions to match the work order to temperatures from the library of temperature requirements for the base coat;
         6. computer instructions to match a tray identifier with the work order and initiate processing and movement of the tray on the conveying system;
         7. computer instructions to match a base coat indicated on a work order with exact volumes from the chemical specification database and instruct the first spray treatment device to automatically flow base coat from the pump room to a first spray treatment device using one of the pumps;
         8. computer instructions to use the chemical specification database to spray the component with the first spray treatment device using exact volumes to form a preset thickness of base coat;
         9. computer instructions to time drying of the component coated with base coat for a predetermined unit of time;
         10. computer instructions to skip selecting, applying and drying a base coat on the component;
         11. computer instructions to match a work order to determine a glaze;
         12. computer instructions to match the work order to temperatures from the library of temperature requirements for the glaze;
         13. computer instructions to match a glaze indicated on a work order with exact volumes from the chemical specification database and instruct the second spray treatment device to automatically flow glaze from the pump room to the second spray treatment device using one of the pumps; and
         14. computer instructions to time drying of the component coated with the glaze over the base coat for a predetermined unit of time;
   c. a tray for supporting a component to be processed using the work order and work order identifier;
   d. a scannable tray identifier attached to the tray adapted to be matched with a work order identifier via the network;
   e. a conveying system for supporting and moving the tray comprising motorized belts connected to the production client device;
   f. a plurality of sensors connected to the production client device with an individual sensors scan the tray identifier a position different from another sensor on the conveying system and each sensor transmitting a signal to the production processor verifying a location of the component in the conveying system;
   g. a first spray treatment device connected to the production client device for spraying a base coat on the component;
   h. a second spray treatment device connected to the production client device for spraying a glaze on the base coat on the component;
   i. a third spray treatment device for spraying a top coat on the glaze of the component automatically as the component is positioned adjacent the third spray treatment device;

j. a pump room connected to the plurality of spray treatment devices, the pump room comprising:
   i. a plurality of pumps wherein each pump is connected to a spray treatment device;
   ii. a tank of base coat connected to one of the pumps;
   iii. a tank of glaze connected to one of the pumps; and
   iv. a tank of top coat connected to one of the pumps; and
k. a plurality of temperature control environments, each temperature control environment positioned around the conveying system for creating temperatures specified by the temperature requirements library for the base coat, glaze, and top coat and the component that match the work order; and wherein the automated system sequentially sprays and dries the component with a base coat, then a glaze, and then a top coat and cures the multilayer finished component automatically.

2. The automated system of claim 1, further comprising: a deionization chamber positioned to receive the tray with the component from the conveying system to remove static and dust from the component prior to spraying with the base coat.

3. The automated system of claim 2, further comprising: an automated brush prior to the deionization chamber to remove particulate from the component on the conveying system.

4. The automated system of claim 3, further comprising: a dust collection system for vacuum removal of particulate and dust from the component positioned between the automated brush and the deionization chamber.

5. The automated system of claim 1, further comprising a stain modification station that provides an activity selected from the group: (i) removing portions of glaze from the component when the message is created (ii) adding portions of glaze to the component when the message is created, (iii) using a specified tool to create a surface quality on the component, and (iv) combinations thereof.

6. The automated system of claim 5, wherein the stain modification station comprises: automated wipers connected to the production client device.

7. The automated system of claim 1, wherein the sales client device, the production client device, or combinations thereof is a laptop, a cell phone, a desktop computer, a tablet, or combinations thereof.

8. The automated system of claim 1 wherein at least two of the temperature control environments further comprise: a heat recycle loop allowing heat from one temperature control environment to supplement the heat of another temperature control environment.

9. The automated system of claim 1, wherein the conveying system further comprises: non-motorized rollers and 360 degree rollers positioned between the motorized belt to facilitate moving of the tray between the spraying apparatus and the temperature control environment.

10. The automated system of claim 1, further comprising at least one alerting device connected to the production client device, wherein the alerting device is a flashing colored light, a cell phone, or combinations thereof.

11. The automated system of claim 1, wherein the sales data storage further comprises:
   a. computer instructions to enter and store customer financial information; and
   b. computer instructions to connect to a financial institution using the network to fund a work order automatically.

12. The automated system of claim 1, further comprising a fourth spray treatment device between the second spray treatment device and the third spray treatment device for applying a second glaze over the first glaze prior to applying the top coat.

13. The automated system of claim 1, wherein the production data storage further comprises computer instructions to instruct one of the sensors connected to the production processor to scan the tray identifier after the base coat is dry and create a message transmitted to an alerting device to remove all or a portion of the glaze.

14. The automated system of claim 1, wherein one or more of the scanners connected to the production client device are a member of the group: a bar code scanner, an RFID scanner, a QR code scanner, or combinations thereof.

15. The automated system of claim 1, wherein the core is a closed cell foam.

16. The automated system of claim 1, further comprising: a door with polypropylene/polyethylene skins embossed with wood grain, a door of polyvinylchloride skins embossed with wood grain, a fiberglass door embossed with wood grain, a steel door embossed with wood grain, a medium density fiberboard embossed with wood grain, a hardboard door embossed with wood grain, or combinations thereof.

17. The automated system of claim 1, wherein the skins have thicknesses from 1 mm to 4.5 mm.

18. The automated system of claim 1, wherein the component comprises a frame between the skins and around the core consisting of a member of the group: fiberglass, a polyvinyl chloride polymer; a composite of graphite and alpha-olefin polymers, wood, plywood, oriented strand board, steel, or combinations thereof.

19. The automated system of claim 1, wherein the component is a door, a door with a door light, a window, a panel for a wall, a floor panel, a component for furniture, a component for shelving, or a component for use in a transportation vehicle.

20. A door made by the automated system of claim 1.

* * * * *